United States Patent [19]

Meyers

[11] 4,012,078
[45] Mar. 15, 1977

[54] WHEEL COVER SNAP ON FASTENER
[75] Inventor: Dale J. Meyers, Logan, Ohio
[73] Assignee: The Goodyear Tire & Rubber Company, Akron, Ohio
[22] Filed: Dec. 8, 1975
[21] Appl. No.: 638,813
[52] U.S. Cl. .................. 301/37 TP; 301/108 A; 24/73 HC; 85/8.3
[51] Int. Cl.² .................................. B60B 7/00
[58] Field of Search ............ 85/DIG. 2, 5 R, 8.3; 24/73 HC, 73 P, 73 PF; 301/37 R, 37 P, 37 AT, 37 CM, 37 SS, 37 L, 37 CD, 37 TP, 37 B, 108 R, 108 A

[56] References Cited
UNITED STATES PATENTS

| | | | |
|---|---|---|---|
| 3,468,210 | 9/1969 | Watts | 85/8.3 |
| 3,485,133 | 12/1969 | Rapata | 85/5 R |
| 3,803,670 | 4/1974 | Johnson | 85/5 R |
| 3,894,775 | 7/1975 | Christoph | 301/37 P |

*Primary Examiner*—Drayton E. Hoffman
*Assistant Examiner*—H. Grant Skaggs
*Attorney, Agent, or Firm*—Barnes, Kisselli, Laisch and Choate

[57] ABSTRACT

A plurality of axially extending resilient prongs on a wheel cover, the free ends of which extend through prong receiving holes in the mounting bolt circle area of a disk of a vehicle wheel. The prongs are bifurcated with a pair of spaced apart axially extending fingers with an integral diagonally and axially extending web therebetween which resiliently biases cam surfaces adjacent the free ends of the fingers. The cam surfaces engage the inner edge of the prong receiving holes to abut the free ends of the prongs with the mounting surface of a hub on which the disk is secured to firmly and tightly retain the wheel cover on the wheel.

2 Claims, 4 Drawing Figures

WHEEL COVER SNAP ON FASTENER

This invention relates to removable decorative covers for vehicle wheels and more particularly to a snap on fastener for removably retaining a wheel cover on a vehicle wheel.

Objects of this invention are to provide a snap on fastener for releasably mounting a wheel cover on the disk of a vehicle wheel which firmly, tightly and securely retains the cover on the wheel and is of rugged and durable construction, economical manufacture, and maintenance and service free.

These and other objects, features and advantages of this invention will be apparent from the following detailed description, appended claims and accompanying drawing (drawn to scale) in which:

Figure 1:
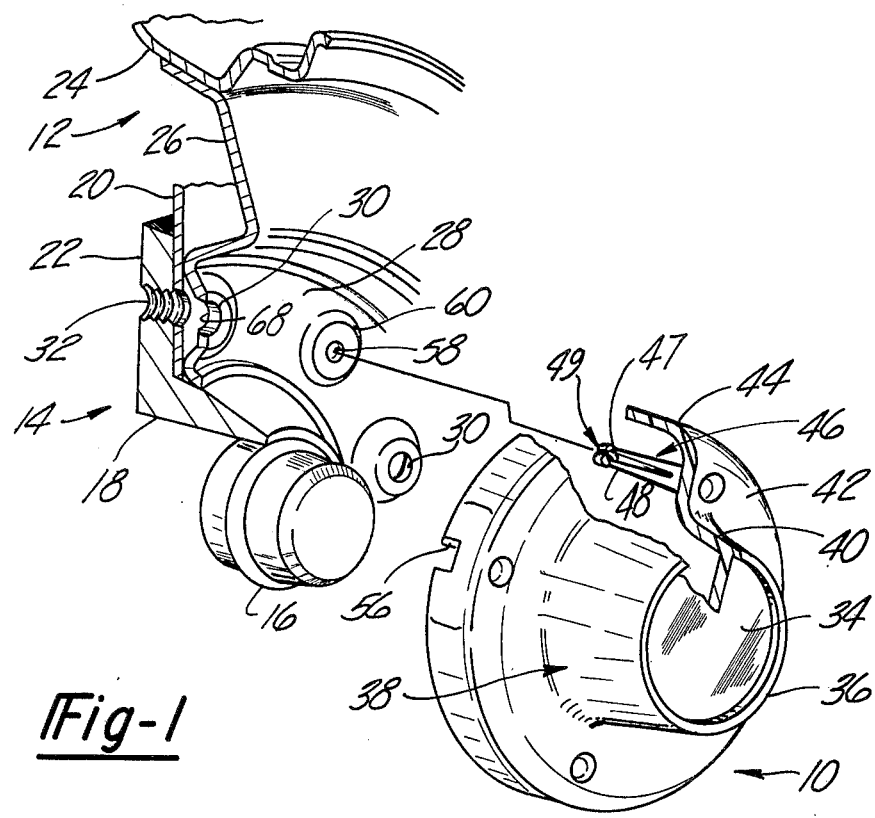
FIG. 1 is a fragmentary isometric view partially in section of a brake drum and associated hub with a wheel cover with prongs embodying the snap on fastener of this invention positioned to be mounted on the wheel.

Referring in more detail to the drawings, FIG. 1 illustrates a wheel cover in the form of a hub cap 10 positioned to be mounted on a conventional automotive wheel 12 which in turn is received on a wheel hub 14 adapted to be mounted on a spindle (not shown). A grease cap 16 is received in a bore 18 of hub 14 and a backing plate 20 of a brake drum (not otherwise shown) is fixed to the outer face of a flange 22 of hub 14. Wheel 12 has a conventional drop-center steel rim 24 fixed as by welding to the outer periphery of a central steel disk 26 which has a conventional bolt circle area 28 with four equally spaced bolt holes 30 therein. Wheel 12 is removably secured to hub 14 by mounting studs (not shown) received in four equally spaced threaded holes 32 in flange 22 of hub 14 which are adapted to register coaxially with mounting holes 30 of wheel 12.

Figure 2:
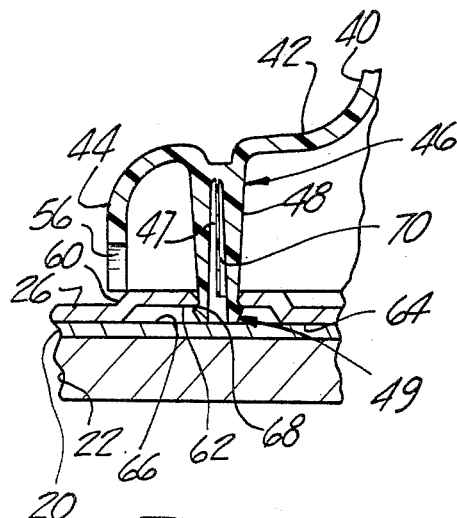
FIG. 2 is a fragmentary sectional view of the hub and wheel of FIG. 1 illustrating the wheel cover securely mounted thereon by the prongs embodying the snap on fastener of this invention.

As shown in FIGS. 1 and 2, hub cap 10 is generally bowl shaped with a generally flat bottom wall 34 encircled by a decorative rib 36 and a side wall 38 defined by a generally axially extending frustoconical portion 40 which curves outwardly into a generally radially extending portion 42 having a reverse curve at its outer periphery and merging into a generally axially extending portion 44. Hub cap 10 is preferably a one-piece unitary homogeneously integral structure preferably injection molded of a plastic material such as polypropylene.

Figure 4:
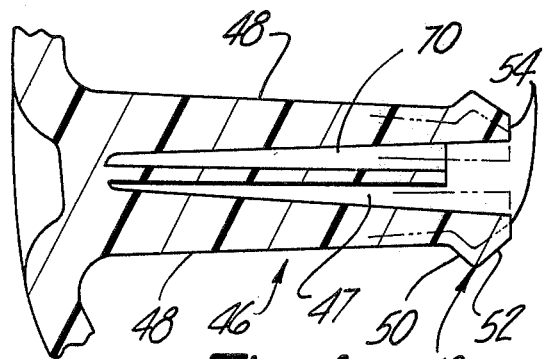
FIG. 4 is a view on line 4—4 of FIG. 3 of the prong.
Figure 3:
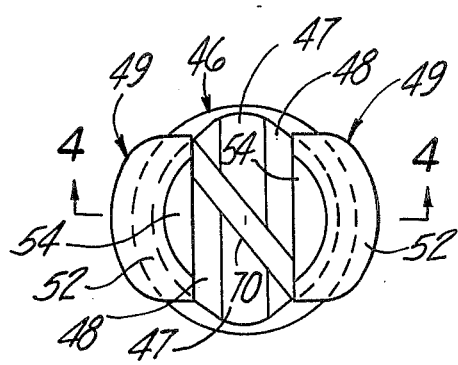
FIG. 3 is an enlarged end view of a prong of the wheel cover of FIGS. 1 and 2.

Hub cap 10 is releasably secured to wheel rim 12 by four equally circumferentially spaced resilient prongs 46 homogeneously integral with and generally axially extending from the inner face of hub cap 10. As shown in FIGS. 2 and 4, each prong 46 is split or bifurcated by a blind slot 47 therein to provide two tapered resilient fingers 48 each having a circumferential rib 49 with a V-shape in axial cross section and extending around the outer periphery of its free end. Each rib 49 thus provides cam surfaces 50 and 52 both inclined with respect to the axis of the finger and to each other. The free end of each finger 48 terminates in a flat abutment surface 54. To facilitate removal of cap 10 from wheel 12, two pry notches 56 are provided diametrically opposite one another in the outer periphery 44 of cap 10 adjacent a diametrically opposite pair of prongs 46.

To retain cap 10 on wheel 12, each prong 46 is individually received in one of four equally spaced retainer holes 58 which extend through associated bosses 60 located in the bolt circle area 28 of disk 26. Preferably, although not necessarily, hub cap 10 is provided with the same number of prongs 46 as there are mounting holes 30, prongs 46 are equally circumferentially spaced on hub cap 10, and retainer holes 58 are located in wheel disk 26 equally circumferentially spaced between mounting bolt holes 30.

Due to manufacturing and material tolerances, the thickness of the metal of the bosses 60 in the bolt circle area of the wheel disk may vary substantially from one disk to another. However, in wheel disks produced by conventional stamping processes the distance between inner face 62 (FIG. 2) of bosses 60 and the inner face 64 of the wheel disks in the area immediately adjacent the bosses is substantially constant from one disk to another. Therefore, when wheels 12 are secured to hubs 14, the generally axial dimension between inner faces 62 of bosses 60 and the juxtaposed surface of the outer face 66 of backing plate 20 is also subsstantially constant. Thus, bosses 60 and plate 20 conjointly provide four pockets each dimensioned within close tolerances for individually receiving therein the free ends of prongs 46.

Prongs 46 are received in bosses 60 with the end abutment surfaces 54 of each prong urged into firm engagement with backing plate face 66. This engagement is produced by cam faces 50 of each prong being urged into firm engagement with the inner edge 68 of each hole 58, as explained in more detail hereinafter. In some hub comstructions, the brake drum backing plate is not mounted on the outer face of the hub flange 22 and thus the inner surface 64 of the bolt circle area bears directly on the hub flange 22 when the wheel is secured thereto. With this type of hub construction, the end abutment surfaces 54 of prongs 46 bear directly on hub flange 22 rather than on the brake drum backing plate 20 as shown in FIG. 2. Hub cap 10 as thus far described herein is disclosed and claimed in the copending patent application of John A. Main Ser. No. 638,814 filed Dec. 8, 1975 entitled "Wheel Cover with Snap on Fastener" which is assigned to the assignee hereof and the disclosure of which is incorporated herein by reference.

In the snap on fasteners of this invention, each prong 46 has a web 70 in slot 47 extending between its pair of fingers 48 to increase the force required to flex fingers 48 generally radially inward from their normal unflexed position when each prong is inserted in an associated hole 58 of a boss 60 which improves and enhances the retention of hub cap 10 on wheel 12. Preferably, web 70 extends diagonally across slot 47, is homogeneously integral with diagonally opposed side edges of fingers 48, extends substantially the entire axial length of slot 47, and terminating adjacent rib 49 of the prong. A one-piece hub cap 10 which has proved satisfactory in practice is made of a polypropylene plastic with a maximum diameter of about 5.71 inches and four prongs 46 each with a minimum diameter adjacent rib 49 of 0.25 inches, a maximum diameter at the base of 0.35 inches, an overall length of about 1.12 inches, a blind slot 47 therein with an axial length of about 0.94 inches, a width at the free end of about 0.136 inches, and at the blind end of 0.062 inches; a rib 49 with a diameter at its apex of 0.343 inches, and a web 70 with a thickness of about 0.030 inches and which terminates about 0.10 inches from the free end of the prong.

To mount hub cap 10 on a wheel 12 (with the wheel secured to a hub 14), the hub cap is positioned (as indicated in FIG. 1) so that prongs 46 are coaxially aligned with holes 58 in the bolt circle area of the wheel disk. Hub cap 10 is then moved generally axially toward wheel 12 to bring cam surfaces 52 of each prong 46 into engagement with the outer edge of an associated hole 58. Cap 10 is then further moved toward the wheel, thereby camming resilient fingers 48 of each prong 46 generally radially inwardly toward each other from their normal unflexed free-state position and distorting their associated web 70 from its normal free-state position so that the free ends of each prong can pass through the associated hole 58. As the apex of rib 49 of each prong 46 passes through hole 58 and cam surfaces 50 reach sliding engagement with the inner edge or margin 68 of the hole, the bias of flexed resilient fingers 48 and their associated distorted resilient web 70 snaps the free ends of the fingers generally radially outwardly, thus urging cam surfaces 50 into firm engagement with the inner margin 68 of hole 58. The camming action of surface 50 in turn urges each prong 46 further through the wheel disk 26 until end faces 54 firmly abut outer face 66 of backing plate 20. Thus, the snap action camming engagement provided by fingers 48 and their associated web 70 tightly and firmly retains hub cap 10 on wheels 12 even though the thickness of the metal of bosses 60 in the bolt circle area of the wheel varies substantially from one wheel to another. Hub cap 10 can be readily removed from wheel 12 by inserting a small pry bar through a selected notch 56 and then manipulating the bar to force hub cap 10 generally axially outwardly of wheel 12. This removal force will cause the free ends of fingers 48 of each prong 46 to be cammed radially inwardly so as to pass axially outwardly through holes 58 in the disk 26 thereby releasing the hub cap from the wheel.

Extending the web 70 diagonally between and making it integral with the side edges of the fingers 48 of the prong 46 provides a means biasing the free ends of the fingers radially outward with a variable spring rate which increases with increased deflection of the free ends of the fingers toward each other. This structure with a diagonally extending web also provides in a compact space a greater total biasing force without increasing the diameter of the prong and the amount of material required to make the prong and/or without exceeding the elastic limit of the material from which the prong is made when the fingers are flexed to pass through the retainer holes 58 in the wheel 12. This variable spring rate and increased total biasing force improves retention of the hub cap on the wheel. The snap action cam prong with spaced fingers interconnected by a web extending diagonally therebetween, which can be formed as a homogeneously integral part of a one-piece hub cap preferably made of a plastic material, also provides a snap action fastener for a wheel cover which is rugged, durable, economically manufactured, and maintenance and service free.

I claim:

1. A removable wheel cover for a vehicle wheel having a rim and a disk fixed thereto which has a plurality of prong receiving holes in a mounting bolt hole circle area thereof with the disk arranged to provide a space having a predetermined axial dimension between the inner margin of each prong receiving hole and the surface on which a disk bears when mounted on a vehicle, and a fastener comprising; at least two prongs carried by said removable wheel cover and extending generally axially from one face thereof with the free end of each of said prongs being constructed and arranged to pass through one of the prong receiving holes, each of said prongs having a pair of generally axially extending transversely spaced apart fingers and a generally axially extending opening therein between said fingers, cam means on each of said fingers of each said prong adjacent said free end thereof and constructed and arranged to engage the inner margin of its associated prong receiving hole and urge the free end of its associated prong into firm engagement with the surface on which the disk bears when mounted on the vehicle, and a web received in said opening between a pair of fingers of each of said prongs, said web extending generally in a plane between diagonally opposed side edges of said pair of fingers and being homogeneously integral therewith, and said wheel cover, prongs, fingers, cam means, and web being a one-piece homogeneously integral body of a plastic material with said fingers and said web being resiliently flexible whereby when the free end of each of said prongs is inserted into its associated prong receiving hole, the free ends of said fingers of each pair are generally radially displaced toward each other to flex said fingers of said pair and distort their associated web so that when their associated cam means passes through said associated prong receiving hole, said flexed fingers of each pair and their associated distorted web move their associated cam means into engagement with the inner margin of said associated prong receiving hole to urge the free ends of said prongs into firm engagement with the surface on which the disk bears when mounted on a vehicle to securely and tightly releasably mount the removable wheel cover on the vehicle wheel.

2. The removable wheel cover of claim 1 wherein the opening between the pair of fingers of each of said prongs extends generally substantially the entire length of said prong to the free end thereof and said web extends generally axially in said opening from the other end of said prong toward said free end to a point adjacent said cam means on said fingers of said prong.

* * * * *